United States Patent [19]

Dunsmore et al.

[11] Patent Number: 4,902,258
[45] Date of Patent: Feb. 20, 1990

[54] ROBOTIC ASSEMBLY SYSTEM

[75] Inventors: John Dunsmore, Renfrewshire, Scotland; David C. Teale, Winchester, England

[73] Assignee: International Business Machines Corp., Armonk, N.Y.

[21] Appl. No.: 792,998

[22] Filed: Oct. 30, 1985

[30] Foreign Application Priority Data

Oct. 30, 1984 [EP] European Pat. Off. ........ 84307461.8

[51] Int. Cl.$^4$ ............................................. H01J 9/00
[52] U.S. Cl. ...................................... 445/23; 445/66
[58] Field of Search ............................ 445/23, 66, 45; 198/345, 346.1, 346.2; 901/6, 7, 8

[56] References Cited

U.S. PATENT DOCUMENTS

| | | | |
|---|---|---|---|
| 3,049,214 | 8/1962 | Cormia | 445/66 |
| 3,126,938 | 3/1964 | McCoy | 198/346.2 |
| 4,201,284 | 5/1980 | Brems | 198/345 |
| 4,360,097 | 11/1982 | Brems | 198/345 |
| 4,369,872 | 1/1983 | Sticht | 901/7 |
| 4,382,500 | 5/1983 | Oyama | 198/346.2 |
| 4,489,821 | 12/1984 | Inaba | 198/346.2 |
| 4,502,585 | 3/1985 | Sticht | 198/345 |

OTHER PUBLICATIONS

*IBM Technical Disclosure Bulletin*, vol. 26, No. 3A, Aug. 1983, L. J. Rigbey, pp. 882-883.

Primary Examiner—Kurt Rowan
Attorney, Agent, or Firm—John B. Frisone

[57] ABSTRACT

A robotic assembly system for the automatic assembly of a complex article such as a CRT display unit has a number of workstations positioned along an open conveyor system at each of which as assembly operation is performed by a conventional stand-alone robot.

Each workstation is provided with a basic lift mechanism (36, 17, 21, 24, 28) which when operated lifts a pallet (4) supplied thereto from the relatively imprecise surface of the conveyor (1) into a predetermined horizontal plane above the conveyor where it is accurately located. A stand-alone robot, programmed to operate with reference to this constant datum position performs the assembly operation associated with that workstation. In order to assist the assembly operation, an air bearing table (17) is incorporated in the lift mechanism to provide the pallet, and any article carried by the pallet, with lateral compliance while held at the datum position. On completion of the assembly operation, the lift mechanism is retracted, lowering the pallet back onto the conveyor for transportation to the next workstation.

The invention is particularly suited for assembly operations involving the handling of potentially hazardous components such as, for example, CRTs during the assembly of a display motor. A modification to the basic lift mechanism enables the assembly of a CRT into its surrounding bezel to be performed. The modification includes the addition of a further lift device (35, 38) which, when operated, lifts a platform (30) through an aperture (34) in the pallet into a second predetermined horizontal plane. To perform the assembly operation, a pallet (4) already supporting a part-cabinet (8) including its bezel surround (9) as a result of a previous assembly operation, is raised into the first datum position. The platform is then raised into the second datum position above the first. A stand-alone robot, programmed to operate with reference to the second datum places and releases a CRT face-plate down on the platform. The platform is then lowered back through the aperture in the pallet leaving the CRT supported in the bezel surround. The pallet is finally lowered onto the conveyor for transportation to the next workstation.

8 Claims, 4 Drawing Sheets

ROBOTIC ASSEMBLY SYSTEM

The invention relates to a robotic assembly system in which articles are transported by a conveyor from one workstation to the next and at each of which an assembly operation is performed by a 'robot'.

The word 'robot' is commonly used to describe a wide variety of devices and machines capable of performing automatic operations, and extends from simple 'pick and place' devices to more complicated universal programmable machines. Included within this range are the so-called 'playback' robots (see the classification of robot types, by the Japanese Industrial Robot Association) which can produce from memory, operations originally executed under human control. A variety of stand-alone devices falling into this category adaptable to perform such tasks as, for example, paint spraying, or welding are commercially available.

Generally speaking such 'play back' robots are unsuitable for assembly operations which demand an interaction between the robot and the parts being assembled with a high degree of precision to ensure that the operation is performed effectively without damage to the cooperating parts. Accordingly, automatic assembly operations of those articles incorporating fragile components and/or components, which by their nature have close-tolerance fits with other components, are very often performed by custom-built robots operating in conjunction with precision conveyor systems. Each individual operation may require a uniquely designed robot and thus the cost of such an assembly system can be extremely high. Furthermore, such a system is fairly inflexible since each individual robot, having been designed for a specific task, is not easily adaptable to perform different tasks.

The problem to which the invention is directed is to provide an automatic assembly system which is not dependent upon the use of a precision conveyor system and which employs commercially available stand-alone robots which are programmable to perform a particular assembly task and adaptable by, for example, the use of interchange tooling to change from one assembly task to another.

The problem is solved by the invention in a particularly elegant and effective manner by providing, at each assembly station, a lift mechanism incorporating a worktable which lifts an article being worked on off an ordinary open conveyor and positions it accurately at a pre-determined height dictated by the selected commercially available 'play-back' robot which has been programmed to perform the next assembly operation at that station. In order to assist the assembly operation, the worktable, which is accurately positioned in the vertical direction, is provided with compliance in all directions in the horizontal plane. This horizontal compliance accommodates the tolerance of the particular assembly tool carried by the robot and driven by the robot software controlling its operation. On completion of the assembly operation, the worktable is lowered and the article replaced on the conveyor for transportation to the next assembly station.

In accordance with the broadest aspect of the invention therefore, a robotic assembly system is provided in which pallets, on each of which an article is to be assembled, are transported by a conveyor from one workstation to the next, at each of which an assembly operation is to be performed by a robot, characterized in that at each workstation means are provided for stopping and coarsely positioning a pallet supplied thereto and each said workstation includes a lift mechanism operable to engage and lift a pallet coarsely positioned thereat from the conveyor into a precisely located vertical position, said lift mechanism including compliant means operable to provide said pallet with lateral compliance in all directions whilst supported by said mechanism in said vertical position, the system further including control means operable in response to detection of a pallet at the workstation to cause said lift mechanism to lift and support the pallet in said vertical position for the duration of a subsequent assembly operation performed by a robot, the pre-programmed operating characteristics of which have been determined with reference to said vertical position of the pallet, and upon completion of the assembly operation to lower the pallet onto the conveyor for transportation out of the workstation.

The particular assembly operation investigated by the Applicants which led to the making of the present invention was the automatic building of a CRT display monitor from its component parts. It should be understood that in the context of the present invention, the term component part is intended to encompass each of the relatively few but very different parts and subassemblies that are normally supplied for the final assembly of a terminal. It is further understood that the majority of these parts will themselves comprise many individual components assembled by means of previous operations of no relevance to the present invention. Thus, in the context of the present invention, one component part is the CRT itself; another is the yoke assembly which is to be fitted over the CRT neck; another is a circuit card to be attached to the yoke; and yet others are the various parts of the enclosing cabinet/chassis including the CRT bezel surround, in which these parts are contained.

Since the CRT is a potentially hazardous component which clearly needs handling with great care, considerable constraints are placed on the assembly apparatus. This is especially the case where the CRT itself is being placed into a surrounding bezel or when a component such as the CRT yoke is being fitted to the CRT neck.

The placement of the CRT into the bezel gave rise to extra problems due to the difficulty in handling this bulky, relatively fragile, and potentially hazardous component. In order to overcome the difficulties, the basic lift mechanism used for the majority of assembly operations was modified by the addition of a second worktable which can be raised and lowered relative to the first worktable. In operation, the bezel is delivered along a conveyor face down to a workstation and is lifted from the conveyor on the first table. The second table is of a size such that it can be raised through the bezel aperture above the first table. When in this position, the CRT is placed face plate down on the second table. The arrangement is such that when the second table is lowered relative to the first table, back through the bezel aperture, the CRT face plate enters the bezel surround. The CRT supported by the bezel surround on the first table is then lowered back on to the conveyor for transportation to the next assembly station where the next operation is performed. The insertion process of CRT into the bezel surround is aided by virtue of lateral compliance which is provided between the two tables supporting the parts.

In accordance with this further aspect of the invention therefore, a method for the automatic assembly of a CRT display unit includes the steps of:

transporting a CRT bezel surround (or cabinet) face down along a conveyor system and stopping the bezel surround at an assembly station;

at the assembly station, raising a first structure having self-centering lateral compliance to lift a bezel positioned thereat into a first predetermined horizontal plane;

raising a second structure through the aperture defined by a CRT bezel located on said first structure into a second predetermined horizontal plane above the first horizontal plane;

causing a robotic device to place and release a CRT tube face-plate down in a predetermined position supported on the raised second structure;

lowering the second structure relative to the first structure in order to insert the CRT tube into the bezel surround; and lowering the first and second structure to replace the CRT bezel surround with CRT located therein onto the conveyor for transportation by the conveyor out of the assembly station.

In order that the invention may be fully understood, a preferred embodiment thereof will now be described with reference to the accompanying drawings.

BRIEF DESCRIPTION OF THE DRAWINGS

FIGS. 1 and 2 show a workstation along a conveyor system with a basic compliant lift mechanism such as is used to perform the majority of assembly operations. The lift mechanism is shown in its inactive or lowered position in FIG. 1 and in its active or raised position in FIG. 2. In this particular example shown, a chain conveyor 1 is used to transport articles to and from the workstation which in its inactive position is located beneath and between the two transporting chains 2 and supporting tracks 3 (only one of each is visible in the figures). Details of the conveyor system are not important to the understanding of the invention and accordingly are not disclosed herein.

Figure 1:
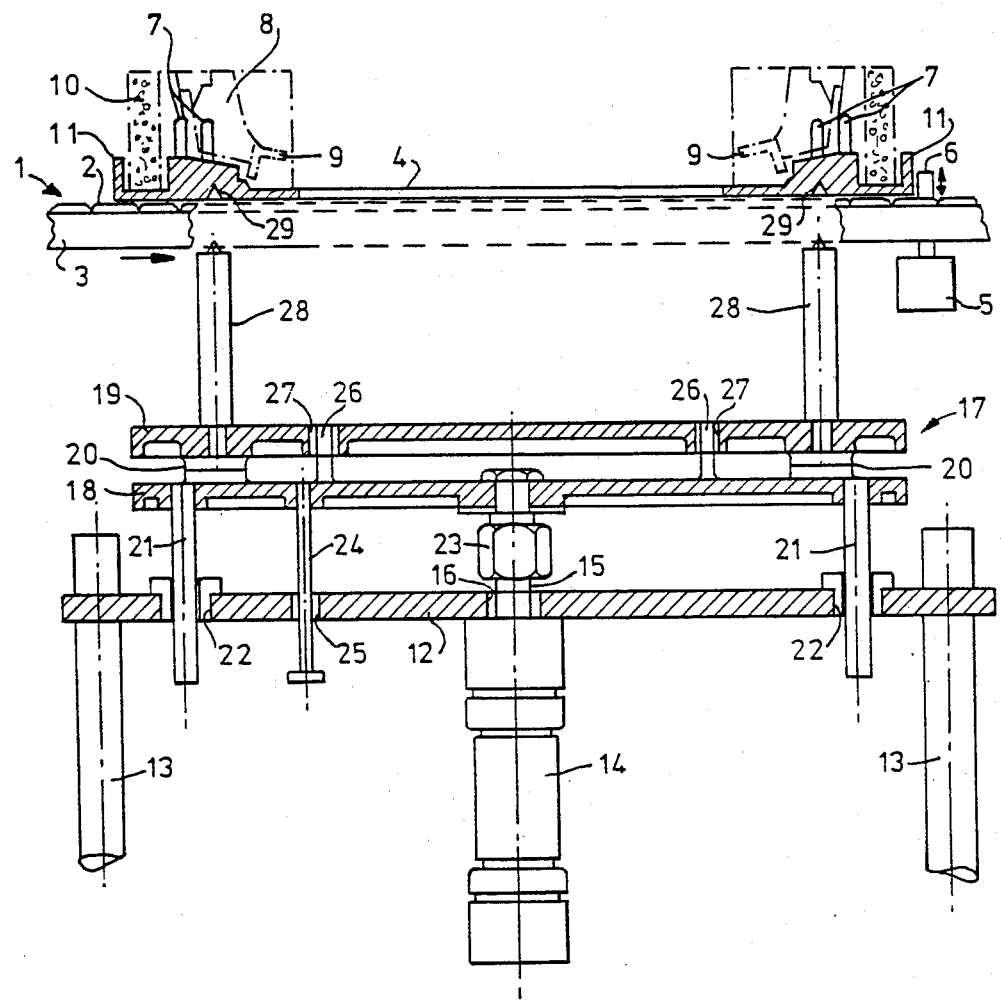
FIG. 1 shows the basic structure of the compliant lift mechanism in its inactive position at a workstation of a robotic assembly line for CRT assembly.

The conveyor tracks are included in the figures so that their position relative to the lift mechanism is clearly understood. A pallet 4 is shown supported on the conveyor track having already been transported into the workstation. An electromechanically operated mechanism 5 positioned between the two tracks is operable to raise a stop 6 into the path of a pallet to arrest its movement along the continuously moving tracks and halt it at the associated workstation. Lateral guide members (not shown) on each side of the conveyor keep the pallet roughly in the required orientation at the workstation.

The pallet 4 is specially constructed to cooperate with the lift fixtures at each workstation in a manner to be described hereinafter. The pallet is also designed to support the first component required by the assembly operation. In this case, the front portion of the CRT cabinet, including the bezel surround into which a CRT is to be inserted and attached, is the first component required. Pins 7 at the four corners of the rectangular pallet are positioned to locate the corresponding four corners of a cabinet and support it horizontally during the subsequent assembly operations. In the figure, a portion of a cabinet 8 including a bezel surround 9 is shown in position on the pallet. In practice, it has been found convenient to keep the cabinet in its original polystyrene packing material 10. The pallet is designed so as to locate the corners of the cabinet through various apertures in the polystyrene packing. Lateral extensions 11 of the pallet support the packing material 10 during the assembly operation. By handling in this manner, the packing material aids in the locating process and supports the cabinet with stability during the entire assembly operation.

The main supporting structure for the compliant lift mechanism at a workstation is a rectangular support plate 12 carried by four columns 13 (only two visible) one at each corner. Adjusting mechanisms (not shown) are provided to enable the plate to be made truly horizontal. The columns are mounted on the floor by vibration/shock mounts (not shown). A large air cylinder 14 is mounted to the underside of the support plate 12 and when energized, drives a piston 15 vertically through an aperture 16 in the support plate. The air cylinder and piston combination is a conventional piece of pneumatically operated apparatus commercially available and is not described further herein. Also for simplicity, the various air lines to the cylinder have been omitted from the drawings.

The piston 15 driven by the air cylinder 14 is used to raise and lower an air-bearing table structure 17 to which it is attached. Details of the air-bearing table structure are to be found in an article, "Air Bearing Table," by L. J. Rigbey in IBM Technical Disclosure Bulletin, Vol. 26, No. 3A, August 1983, pp. 882-883. Briefly, the air-bearing table structure is in two parts: a lower base casting 18; and an air-bearing table 19. In use, the air-bearing table is supported on cushions of air supplied by four air-bearings 20 (only two visible), disposed one at each corner of the structure. For simplicity, the air lines and air ducts supplying air to these bearings are omitted from the drawings. The lower base casting 18 is mounted for slidable vertical movement above the support plate on four linear bearings 21 (only two visible) extending downwardly through apertures 22 in the support plate. In order to prevent the piston and linear bearings acting in opposition to each other and possibly jamming, the piston 15 is attached to the base casting 18 via a flexible coupling 23. An adjustable stop pin 24 also extends downwardly from the underside of the base casting through an aperture 25 in the support plate 12 to provide positive positioning of the table structure in the vertical direction. Limit stops for lateral movement of the air bearing table are provided by two cylindrical posts 26 which extend vertically from the lower casting into clearance holes 27 in the table itself. Four low-rate compression springs supported in symmetrically positioned longitudinal holes (none of which are shown for simplicity) in the table bear on the two posts. The arrangement is such that two springs bear on each post and are individually adjustable and positioned relative to the posts and to each other to provide pre-load centering forces to balance and center the table with constant clearance around the posts. Details of the spring arrangement can be seen in the hereinbefore referenced article in the IBM Technical Disclosure Bulletin. The table and its air bearings are designed so as to provide a large vertical stiffness with low resistance to lateral movement within the limits defined by the clearance around the stops.

Upwardly extending from the top surface of the air-bearing table 19 are four shot pins 28 (only two visible in the drawings). One shot pin is provided at each corner of the air-bearing table, and all are of equal length so that when the table structure is raised by the operation of the air cylinder 14, the conical ends of the pins enter corresponding shaped and positioned apertures 29 in the underside of a pallet held roughly positioned at a workstation and lifts it off the conveyor track. Clearly, the size of the mating apertures in the underside of the pallet must be sufficient so that within the tolerance of a coarsely positioned pallet, the shot pins will always enter the apertures on being raised. Any small misalignment of the pallet apertures 29 and the shot pins 28 is accommodated by virtue of the lateral compliance of the air-bearing table. Once lifted from the conveyor, the pre-load springs center the table about its limit stops, as explained hereinbefore, so that the position of the pallet in the horizontal plane becomes accurately defined. The vertical height of the pallet is precisely defined by the length of the adjustable stop pin 24. With such a compliance lift mechanism in accordance with the invention, a robot can be programmed to perform an assembly operation with the confidence that the vertical position of each pallet lifted from the conveyor at the workstation is accurately and precisely known and is constant during repeated operations.

Figure 2:
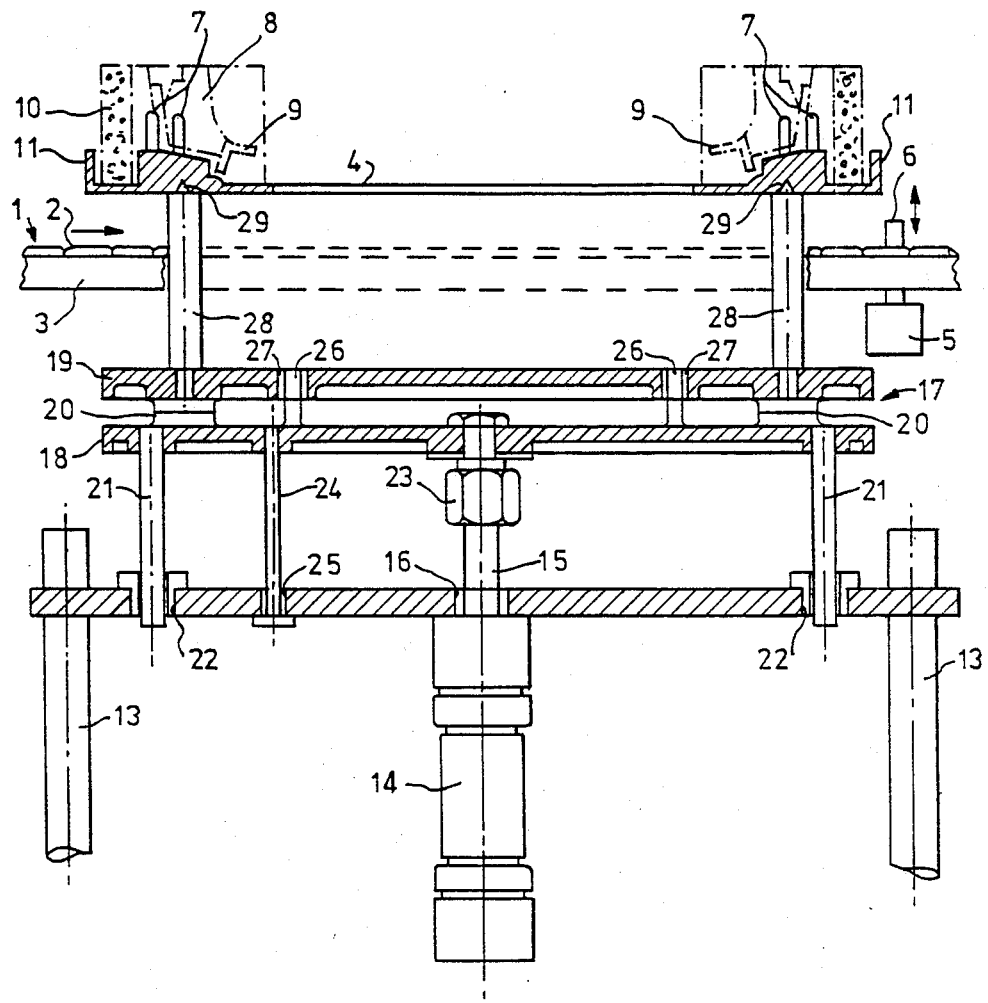
FIG. 2 shows the basic structure of the mechanism of FIG. 1 in its active position lifting a pallet off a conveyor line at the workstation.

This completes the description of the lift mechanism structure in its basic form as used at the majority of workstations. Briefly, the sequence of operations performed by the lift mechanism is as follows:

The pallet stop 6 is raised to its upper position in order to stop a pallet at the associated workstation on the continuously running conveyor 1. An optical sensor (not shown) detects the arrival and presence of a pallet at a workstation. Under computer control, the arrival of a pallet signals the start of the assembly operation at that station. First, the air cylinder 14 is energized, raising the air table structure from its lowered position in FIG. 1 to its raised position in FIG. 2. During the movement, the shot pins 28 enter the corresponding holes 29 and lift the pallet from the conveyor tracks into a precise vertical datum position. The assembly operation is then conducted by a stand-alone robot which has been previously programmed so that its operational plane of assembly corresponds to the precise vertical datum position defined by the lifted pallet. Upon completion of the assembly operation, a condition determined by further sensor mechanisms, the fixture lowers the pallet back onto the tracks. The stop 6 meanwhile has been retracted and the pallet is automatically transported by the conveyor track out of the workstation to the next. Typical assembly operations using this basic form of compliant lift mechanism at workstations include the following:

1. placement of part cabinet or chassis including the bezel surround face down onto a pallet;
2. after placement of a CRT into the bezel surround by means of a modified lift mechanism, to be described hereinafter, the securing of the CRT into the surround by the insertion of four screws through lugs on the CRT into the cabinet;
3. placement and glueing of a CRT yoke assembly around the neck of the CRT;
4. assembly of a video card to the CRT yoke;
5. assembly of circuit cards into appropriate slots in the part cabinet or chassis;
6. placement of the rear cover to the cabinet; and
7. securing the rear cover in place by further screws.

Each of these assembly operations is performed by a stand-alone robot at a workstation where the position of the receiving component is first accurately located in 3-dimensional space by means of a compliant lift mechanism as has been described hereinbefore.

Figure 3:
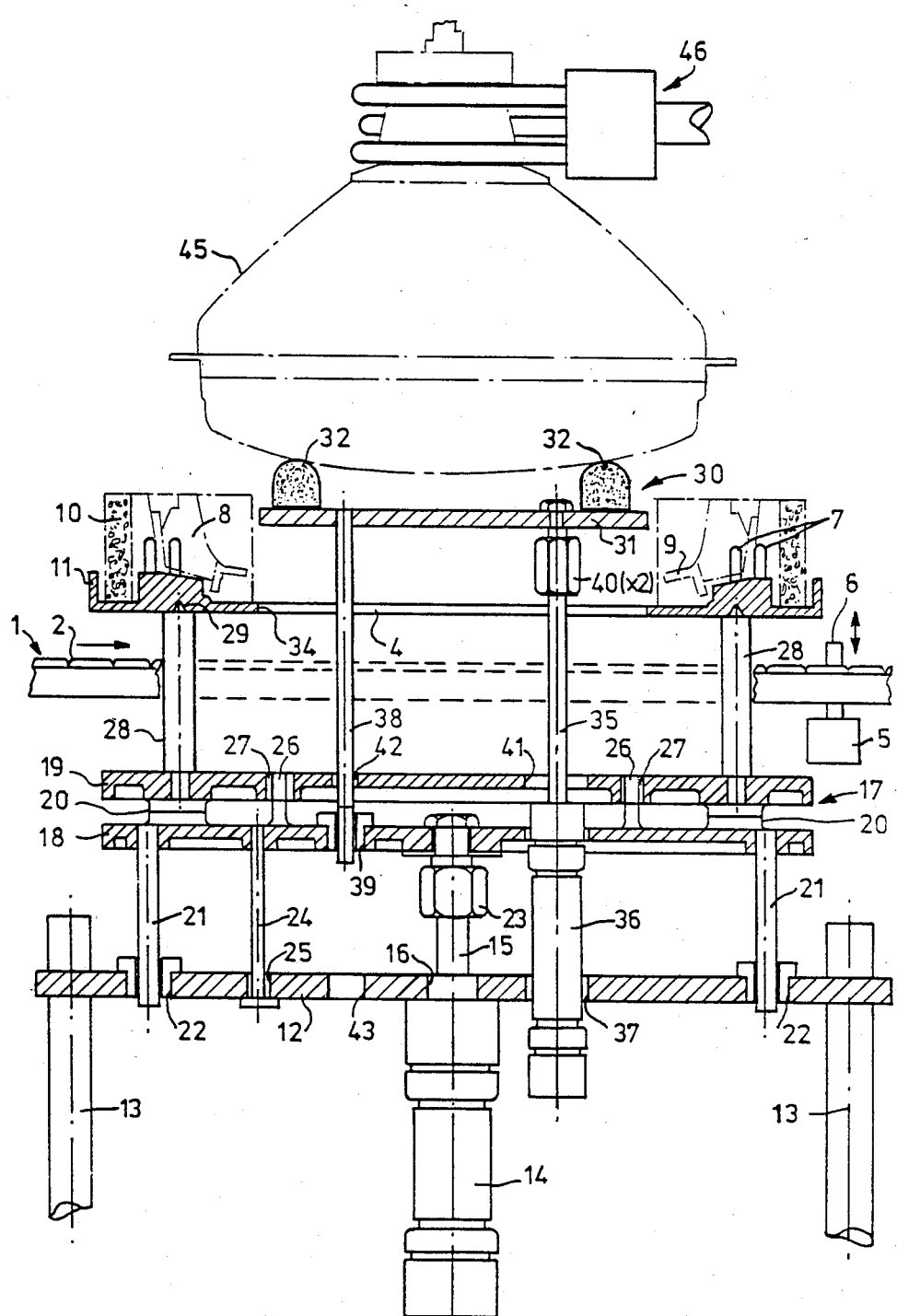
FIG. 3 shows a modified compliant lift mechanism used at a workstation for placing a CRT into the bezel surroundings of a CRT cabinet.

The modified lift mechanism for assembly of a CRT into the bezel of a part cabinet is shown in FIG. 3. In this figure, the component parts common to the basic lift mechanism, described hereinbefore, are identified using the same reference numerals as those used in FIGS. 1 and 2. The modification to the mechanism consists of the addition of a further pneumatically operated table 30 which comprises a rectangular CRT platform 31 carrying four monothane pressure domes 32 (only two visible in the figure), disposed one at each of the four corners. The size of the CRT platform is such that it is capable of passing through a face plate aperture of a CRT, defined by the bezel surround 9. A correspondingly sized aperture 34 is provided in the base of the pallet 4 through which the table 30 passes when raised to its upper position.

The CRT platform is raised and lowered vertically by means of two air pistons 35, driven by two air cylinders 36 (only one of each visible in the figure). The air cylinders are mounted to the base casting 18 of the air-bearing table 17 and extend downwardly through apertures 37 in the support plate 12. The apertures provide the cylinder bodies with sufficient clearance to permit relative vertical movement as the air-bearing table is raised and lowered during operation. Two linear bearings 38 (only one visible in the figure) slidably mounted in apertures 39 in the base casting 18 provide controlled guidance of the table 30 as it is raised and lowered. The pistons 35 are connected to the CRT platform 31 via flexible couplings 40 (only one visible in the figure) in order to avoid the possibility of the pistons and linear bearings acting in opposition to one another and jamming. Clearance holes 41 and 42 are provided in the air-bearing table 19 for the piston (and its flexible coupling) and linear bearing respectively so that the lateral compliance of the air-bearing table is not impeded. Although shown in the figure, with this arrangement, the posts 26 limiting lateral movement of the air bearing table 19 may be dispensed with. A clearance hole 43 is also provided in the support plate 12 to accommodate the protruding end of the linear bearing when the table is in its lowered position.

Figure 5:
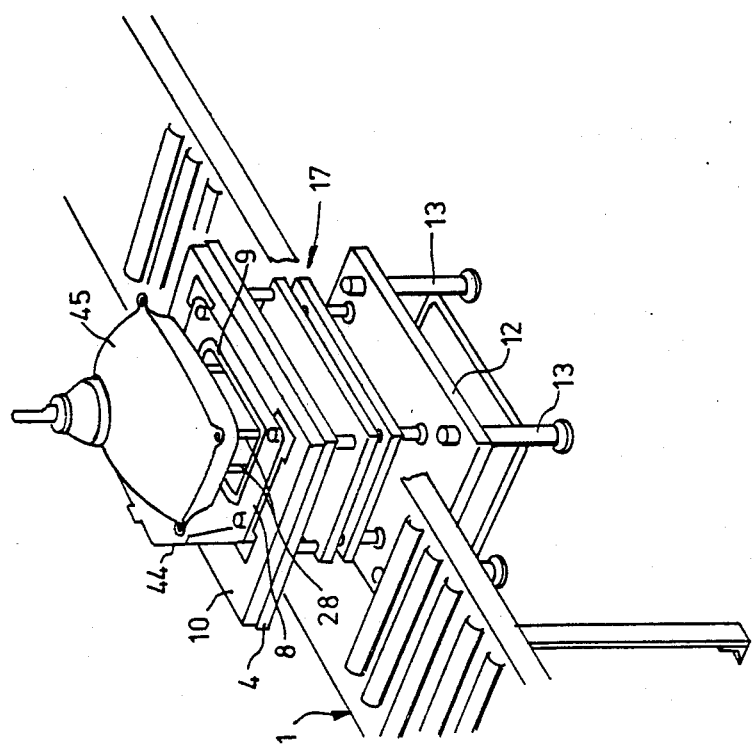
FIG. 5 shows a schematic view of the same part assembly line with the CRT in place carried by the modified lift mechanism.
Figure 4:
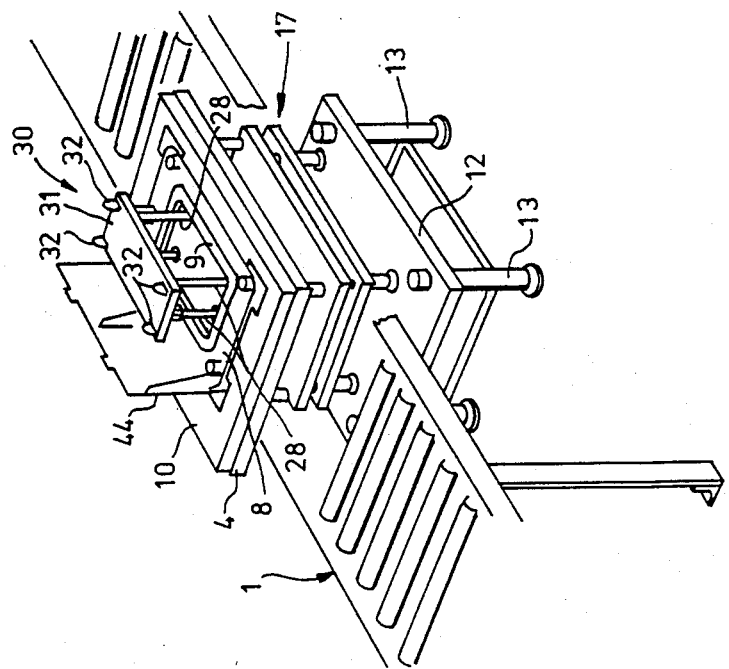
FIG. 4 shows a schematic view of a part assembly line including a workstation with a modified lift mechanism in its active position, ready to receive a CRT.

The operation of the modified lift mechanism will now be described with reference to FIG. 3, together with FIGS. 4 and 5, which show schematically the apparatus at two different stages during an assembly operation. The same reference numerals are used in FIGS. 4 and 5 as have been used previously in order to identify corresponding components in the different figures. Some differences in detail are apparent in FIGS. 4 and 5 from that shown in the other drawings. The differences are only minor and are included to illustrate that there are many changes in detail that can be made without departing from the spirit and scope of the present invention. Thus, for example, the conveyor in FIGS. 4 and 5 is shown as comprising driven rollers instead of a continuous chain track. A variety of different conveyor tracks are commercially available and provided a conveyor is capable of supplying a pallet to a workstation and thereafter removing a pallet from a workstation, it may be used as part of the assembly line. Indeed, as has been stated hereinbefore, one important advantage of the present invention is that it permits he use of imprecise open conveyors which may not guarantee the repetitive positioning of articles they carry with sufficient accuracy required in order to cooperate with a stand-alone robot. Also, the shape of the packing material 10 shown in FIGS. 4 and 5 is different from that shown in FIGS. 1 to 3. This again is to illustrate the adaptability of the present invention for the assembly of a variety of different CRT displays. The shape and size of the pallet is clearly selected before hand to suit the size and shape of the article it is to carry.

In operation therefore, the compliant lift mechanism picks up a pallet 4 delivered to the workstation at which a CRT is to be inserted into a bezel surround. It will, of course, be understood that the part cabinet including the bezel surround into which the CRT is to be placed, has been previously loaded into and is carried by the pallet. An optical sensor (not shown) detects the presence or absence of the part cabinet, and signals appropriately to the controlling system. In FIG. 4, a part cabinet is shown surrounded by its packing material 10 supported on the pallet 4. The part cabinet comprises that part which will eventually be the front of the display including the bezel surround 9 and also a portion of the base 44 of the display. A signal indicating that the part cabinet is in place and fully raised on its pallet above the conveyor track is supplied to the controlling system. This signal causes the initiation of the lifting operation of the second table 30. Air cylinder 36 is energized and the table 30 is raised from its rest position below the transporting surface of the conveyor 1, through the aperture 34 in the pallet; through the bezel surround 9 of the part cabinet 8; and brought to rest at a precise vertical height above the pallet carrying the bezel surround.

In the examples shown in the figures, the height to which the second table is raised is determined solely by the length of stroke of the cylinder 36. Equally well, it could alternatively be determined by the length of an independent device such as the stop pin 24 used in the basic lift mechanism to set the height of the air-bearing table 17. FIG. 4 shows the apparatus in its operational state with the table 30 in its fully lifted position through and above the face plate aperture defined by the bezel surround.

A further optical sensor (not shown) detects the table 30 in its fully lifted position and signals to the system controller accordingly. An assembly robot previously programmed with the table's absolute height, then places a CRT 45 face plate down on the four domes 32 and releases it. The CRT gripper 46 is shown schematically in FIG. 3. The nature of the gripper has no bearing on the present invention and, accordingly, details of its structure are not given herein. FIG. 5 shows the fixture in its fully raised state with a CRT in place on the table 30.

Following placement of the CRT, the controlling system causes the table 30 to be lowered back through the face plate aperture leaving the CRT correctly located in the bezel surround. Clearly, the positioning of the CRT on the platform is important since it must be correctly aligned with respect to the bezel into which it is to be fitted. However, the lateral compliance of the air-bearing table supporting the cabinet and bezel surround compensates for any small misalignment and aids the insertion operation. Finally, the air-bearing table is lowered depositing the pallet carrying the part cabinet now supporting a CRT on to the conveyor which, since it is running continuously, transports the pallet out of the workstation along the conveyor to the next workstation.

As will be apparent from the foregoing, the entire automatic assembly operation is conducted under computer control. The function of the computer, which in this particular example is an IBM Personal Computer workstation connected to an IBM Series 1 processor, is to collect the data supplied by various "in-place" sensors associated with the assembly line and to provide signals to the controllers of the various stand-alone robots at the workstations to initiate their individual tasks and cause them to be performed in a particular sequence. Clearly, safety of operation is of paramount importance as well as speed of operation and cost. The provision of accurate datum positions and lateral compliance at each workstation by means of the invention enables the stand-alone robot to work at high speed in safety. The invention precludes the need for a precision conveyor with an estimated saving of approximately 30%. Although the preferred embodiment described hereinbefore is concerned with the automatic assembly of a CRT monitor, the invention is useful in any assembly situation where interaction between robot and parts requires a high degree of precision.

Having thus described our invention, what we claim as new and desire to secure as Letters Patent is as follows:

1. A robotic assembly system in which pallets, on each of which an article is to be assembled, are transported by a conveyor from one workstation to the next, at each of which an assembly operation is to be performed by a robot, characterized in that at each workstation means are provided for stopping and coarsely positioning a pallet supplied thereto, and each said workstation includes a linear lift mechanism operable to engage and lift a pallet coarsely positioned thereat from the conveyor, along an axis, into a precisely located vertical position, said lift mechanism including compliant means operable to provide said pallet with lateral compliance in all directions within a plane which is substantially normal to said axis while supported by said mechanism in said vertical position, the system further including means at the workstation to cause said lift mechanism to lift and support the pallet in said vertical position for a subsequent assembly operation performed by a robot, the pre-programmed operating characteristics of which have been determined with reference to said vertical position of the pallet, and upon completion of the assembly operation to lower the pallet onto the conveyor for transportation out of the workstation.

2. A robotic assembly system as claimed in claim 1, in which said compliant means comprises an air bearing table structure having a lower base member and an upper table, said upper cable being supported in operation by air bearings located between the base member and the table.

3. A robotic assembly system as claimed in claim 2, in which said lift mechanism further includes a base support structure, a lifting device connected between said support structure and said base member of said air bearing table structure, operable to raise the air bearing structure to an upper position or to lower it to a lower position, and locating means of extending upwardly from the air bearing table which, when the table is in its lower position, is entirely below the plane of the conveyor at its associated workstation, but, when the table is in its upper position, extends beyond the plane of the conveyor surface, the construction and arrangement of said upwardly extending locating means being such that on raising from the lower to upper position it cooperatively engages with associated features on a pallet, coarsely positioned at said workstation, and lifts the pallet from the conveyor supported on said locating means, said precisely located vertical position to which the pallet is raised being defined by the upper position to which the air bearing table structure is raised.

4. A robotic assembly system as claimed in claim 3, in which said locating means comprises four vertical pins of equal length disposed in rectangular configuration, each having its upper end tapered to a conical point, each pallet being provided on its underside with four correspondingly positioned mating apertures, the size of the apertures being sufficient to accommodate the positional tolerances of a pallet coarsely positioned at the workstation thereby to ensure that, on raising the air-bearing table, the points of the locating pins will always enter the mating apertures.

5. A robotic assembly system as claimed in claim 4, adapted to assemble a CRT into its bezel surround, said bezel surround being carried face down on a pallet previously supplied along the conveyor to the workstation, the adaption including providing said lifting mechanism with a second lifting device operable to raise and lower a platform through an appropriately sized aperture in said pallet, its arrangement being such that when in its lowest position, the platform lies entirely below the plane of the conveyor surface and when at its highest position the platform is at a second precisely located vertical position above said first vertical position, said platform being provided with CRT receiving means for stably supporting a CRT placed face-plate down thereon and the dimensions of the platform being such that no portion of the platform extends laterally beyond the bounds of the face-plate of a CRT supported thereon, said control means being further operable in response to detection of said platform at the second vertical position to cause a robot, the pre-programmed operating characteristics of which have been determined with reference to said second vertical position, to place and release a CRT face-plate down on said CRT receiving means; further in response to detection of a CRT on said CRT receiving means and detection of said pallet at the first vertical position to retract the second lifting device to lower the CRT into the bezel surround supported at the first vertical position; and further, following full retraction of said second lifting device, to retract said first lifting device to lower the pallet carrying the bezel and CRT onto the conveyor for transportation out of the workstation.

6. A robotic assembly system as claimed in claim 5, in which the second lifting device is mounted on said lower base member of said air bearing table structure and extends upwardly through apertures in said air bearing table of sufficient magnitude not to impede the lateral compliance of said air bearing table.

7. A robotic assembly system as claimed in claim 5 or 6, in which said CRT receiving means comprises four identical resilient domes disposed in rectangular configuration on said platform.

8. A method for the automatic assembly of a CRT display unit includes the steps of:
- transporting a CRT bezel surround (or cabinet) face down along a conveyor system and stopping the bezel surround at an assembly station;
- at the assembly station, raising along an axis a first structure having lateral compliance in all directions within a plane which is substantially normal to said axis to lift a bezel positioned thereat into a first predetermined plane substantially normal to said axis;
- raising a second structure through the aperture defined by a CRT bezel located on said first structure into a second predetermined plane substantially normal to the said axis and located above the first plane;
- causing a robotic device to place and release a CRT tube face-plate down in a predetermined position supported on the raised second structure;
- lowering the second structure relative to the first structure in order to insert the CRT tube into the bezel surround; and
- lowering the first and second structure to replace the CRT bezel surround with CRT located therein onto the conveyor for transportation by the conveyor out of the assembly station.

* * * * *